June 29, 1965 S. F. STRYKER 3,191,720
LUBRICATING APPARATUS
Filed Aug. 27, 1963
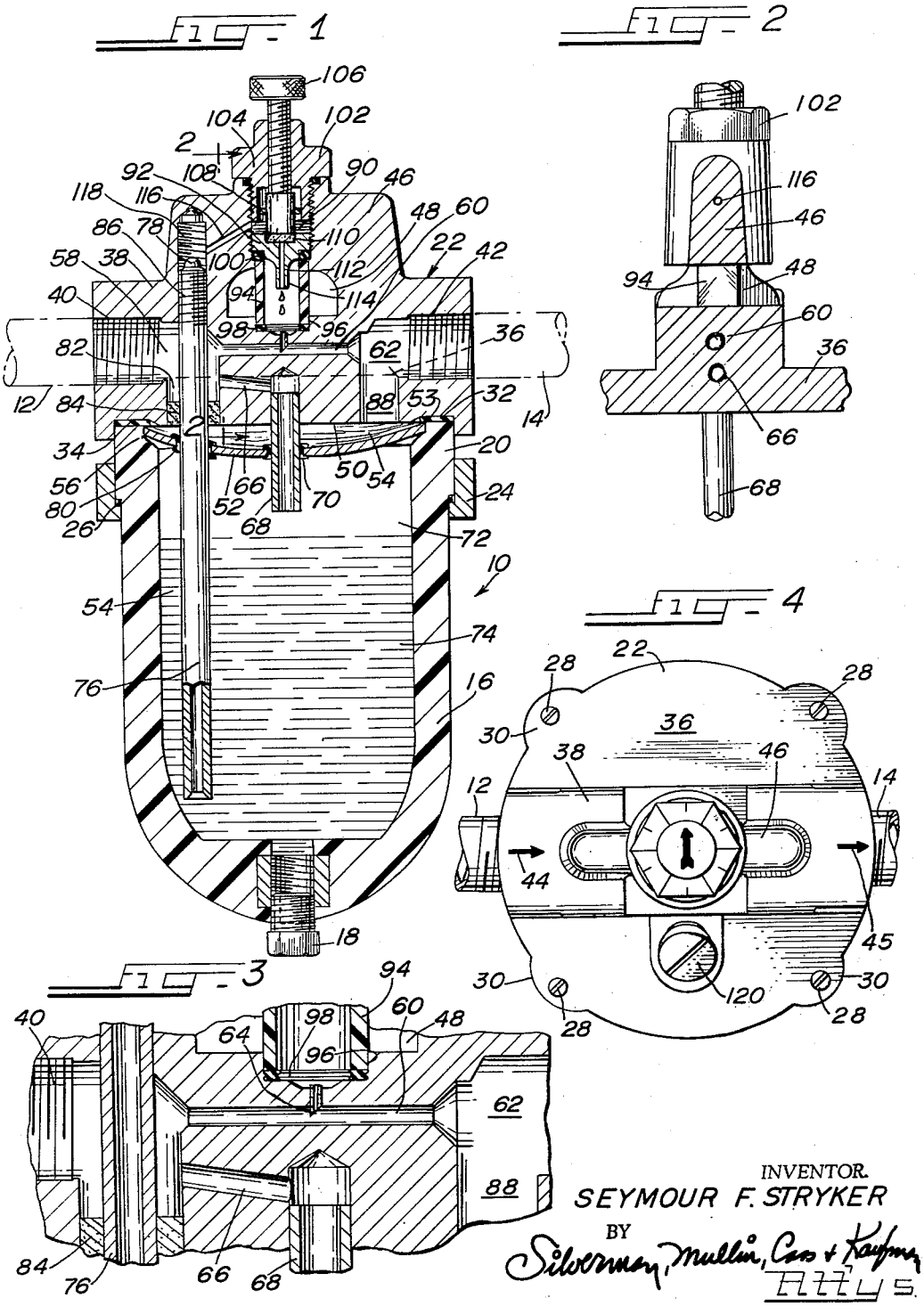
INVENTOR.
SEYMOUR F. STRYKER United States Patent Office 3,191,720
Patented June 29, 1965

3,191,720
LUBRICATING APPARATUS
Seymour F. Stryker, Evanston, Ill., assignor to Air-Mite Devices, Inc., Chicago, Ill., a corporation of Illinois
Filed Aug. 27, 1963, Ser. No. 304,882
9 Claims. (Cl. 184—55)

This invention relates generally to lubricating apparatus and more particularly it is concerned with apparatus whereby lubricant is introduced into air lines leading to pneumatic devices.

The necessity and purpose for such lubrication are too well-known to require discussion. The problems overcome by the invention herein are those which are concerned with the provision of simple apparatus which will assure a steady stream or aerosol of lubricant with a wide range of changes of air pressure and in which the amount of lubricant may be controlled manually.

The primary object of the invention is to provide lubricating apparatus for the introduction of lubricant into air lines leading to pneumatic devices in which the apparatus provides positive air lubrication over a wide range of air pressures without the need for moving parts of any kind.

Still a further object of the invention is to provide such a device which is extremely simple to manufacture and does not require complex casting or machining of any of the parts to provide tortuous chambers or passageways therein.

Many other objects of the invention will become apparent to those skilled in this art as a preferred embodiment is described hereinafter in connection with which a drawing illustrates the same.

In the said drawing:

FIG. 1 is a median sectional view taken through a lubricating apparatus constructed in accordance with the invention and showing the construction thereof.

FIG. 2 is a fragmentary sectional view taken through the device generally along the line 2—2 of FIG. 1 and in the direction indicated.

FIG. 3 is a fragmentary enlarged view of a portion of FIG. 1.

FIG. 4 is a top plan view of the apparatus.

Generally the invention is characterized by the provision of a lubricant bowl having a cover member clamped thereto, air line inlet and outlet ports in the cover member connected by a necked or constricted passageway into which lubricant is adapted to be introduced for atomization, an auxiliary chamber formed above the bowl between the cover member and the space above the lubricant connecting with both the inlet and outlet ports of the cover member but having a direct connection with the outlet and a connection with the inlet that is blocked off by a porous member of metal so that air may pass through the porous member, the upper chamber and out through the outlet port thereby by-passing the necked passageway. An additional connection from the inlet passes by way of a conduit through the auxiliary chamber into the bowl above the lubricant forcing the lubricant to enter another conduit or dip tube to rise in the dip tube above the neck or constricted passageway and be dropped upon the constricted passageway at which point it is atomized.

Referring now generally to the figures, in FIG. 1 there is illustrated the lubricating apparatus 10 which is adapted to be connected into an air line, the inlet portion of which is indicated at 12, and the outlet portion of which is indicated at 14. There is a plastic bowl 16, preferably transparent, having a bottom drain plug 18 and a flanged upper end 20 by means of which the bowl 16 is clamped to a cover member 22. An annular ring 24 below the flange 20 suitably gasketed as at 26 is held to the cover member 22 by suitable screws 28, not shown in FIG. 1 but readily visible in FIG. 4. The screws pass through suitable bosses or ears 30 integral with the cover member 22 and engage threaded sockets (not shown) in the annular ring 24. When drawn up, they pull the flanged end 20 into a suitable groove 32 formed in the bottom surface of the cover member 22 in engagement with the gasket 34 that is laid in the said groove.

The cover member 22 is usually formed as a casting suitably drilled and machined to provide passageways and sockets, as will be explained. The cover member is relatively thin, its upper surface 36 being indicated by the broken line in FIG. 1. There is a central, transverse enlargement 38 which is drilled and tapped at 40 to receive the threaded inlet pipe 12, this being the inlet port, and likewise is drilled and threaded at 42 to receive the end of the threaded outlet pipe 14, the opening 42 being the outlet port. As noted from the view of FIG. 4, suitable arrows may be cast or otherwise marked at 44 and 45 on the top of the enlarged portion 38 to mark the flow of air. A bridge 46 is formed integral with the enlarged portion 38, the purpose of which shortly will be explained, but there is an opening in the bridge crosswise of the enlarged portion 38 as indicated at 48 through which the amount of oil introduced by means of the apparatus 10 may be seen.

The bottom surface 50 of the cover member 22 is flat, and there is a dished metal member 52 engaged upon this surface and held in place by any suitable means whereby to form an auxiliary chamber 54 between the dished member 52 and the surface 50. Although the dished member 52 is preferably engaged by a suitable groove 56 formed in the flange end 20 of the bowl 16 to clamp same in place, other means may be employed to hold the dished member 52 tightly against the surface 50. The inlet port 40 opens to a chamber 58 which has three outlets. The first is the neck or constriction 60 which extends through the cover member 22 in the enlarged portion 38 coaxial therewith to communicate with the chamber 62 that in turn connects with the port 42, and a small jet 64 mounted in cover member 22 is introduced into the constriction 60 opening on an angle directed downstream so that air passing from left to right through the constriction 60, as viewed in FIG. 3, will draw oil out of the jet 64. The second outlet from the chamber 58 is through the cover member 22 along the connecting passageway 66 to a central conduit 68 that in turn passes through the dished member 52 by way of the rubber grommet 70 so that the frictional engagement between grommet and conduit 68 helps hold the dished member 52 in place. The bottom end of the conduit 68 opens to the air chamber 72 which is above the level of the oil 74 disposed in the bowl 16. This outlet from the chamber 58 raises the air pressure above the body of oil 74 tending to force the oil to enter the bottom of the dip tube 76, pass up the dip tube and out the top thereof, raising the ball 78 from a seat formed on the upper end of the dip tube 76.

Note that the dip tube also passes through the air chamber 72 and the auxiliary chamber 54 by way of another rubber grommet 80 which also helps hold the dished member 52 in place. The third outlet of the chamber 58 is a large passageway 82 that extends downwardly therefrom and opens to the surface 50 thereby communicating with the auxiliary chamber 54 but such outlet 82 is blocked by a porous metal member 84 which in the preferred embodiment is formed of sintered bronze. The member 84 is in the configuration of an annular plug, and the upper end of the dip tube 76 passes through this plug into the bridge being threaded in place as shown at 86.

The chamber 62 has a connection at 88 with the auxiliary chamber 54 so that any air which passes from the chamber 58 through the porous member 84 and into the auxiliary chamber 54 will also pass by way of the connection 88 into the chamber 62 and out the port 42.

The bridge 46 has a vertical central threaded bore at 90. A hollow threaded bushing 92 is engaged in the bottom of the bore and a transparent, cylindrical sight glass 94 extends from the bottom of the bore 90 in which its upper end is enclosed, through the open space 48 and is engaged in a seat 96 formed in the enlarged portion 38 immediately above and in communication with the jet 64. Suitable gaskets at 98 and 100 prevent leaking of oil when the apparatus is in operation. The bushing 92 is tightly engaged upon the sight glass 94 to clamp the same in place.

The threaded bore 90 has an upper plug 102 engaged therein and sealed by means of an O-ring 104. A thumb screw 106 is threaded through the plug 102 and carries a sealed plunger or piston 108 on its bottom end, there being a felt plug 110 disposed in the top of the bushing 92. A fine passageway 112 in the bushing 92 terminates in a nozzle or drop-former 114 so that drops of oil can be seen through the sight glass 94.

By rotating thumb screw 106 and varying the compression upon the felt plug 110, one may control the amount of oil which will pass through the passageway 112. Oil finds its way into the bore 90 by way of a passageway 116. The purpose of the ball check 78 is to prevent oil from draining back into the dip tube 76 when pressure is relieved so that when pressure is once more applied, oil will be in the upper chamber 118 ready to flow into passageway 116.

In operation the device is first filled with oil by way of a screw plug 120 that engages through the upper surface 36 of the cover member and passes by way of a conduit and grommet quite similar to the conduit 68 and grommet 70 into the upper chamber 72. This conduit which is not shown also aids in holding the dished member 52 in place.

When pressure is applied, air enters the inlet port 40, a portion passing by way of the small passageway 66 into the conduit 68 thereby applying pressure in air chamber 72 upon the oil 74 to cause the same to flow into the dip tube 76, up the dip tube into the chamber 118, by way of the passageway 116 into the bore 90 and down through the sight glass into the jet 64. Another portion of the air passes through the constriction 60, atomizes the oil dripping out of the jet 64 into the chamber 62 from which the oil passes by way of the outlet 42 into the pipe 14 and thence by way of air lines to the pneumatic devices served. A portion of air also passes from the chamber 58 downwardly through the porous metal member 84 by way of the auxiliary chamber 54 through the opening 88 and out through the outlet 42 thereby bypassing the constriction 60. The greater the pressure, the more air will pass through the auxiliary chamber 54. In this manner there will be an even flow of oil continuously dispensed, and low pressures will find greater resistance to passage through the porous member 84 thereby enabling more facile atomization of the oil at the jet 64.

In operation, the device functions automatically without the need for flapping rubber members or valves of any kind. It is therefore quiet in operation and has no parts to wear out. Furthermore, it has been found that there is no need to provide different constructions and configurations in order to handle differing degrees of air pressure. In cases where mechanical valves are used in order to provide for greater by-pass or higher pressures, differing strengths of springs and sizes of valves are needed in order to extend the range of operation of the lubricating devices to differing air pressures.

It will be seen that the cover member 22 is made as a simple casting with a flat bottom surface 50, and a dished member 52 is engaged to this surface. Conveniently such dished member is easily stamped from sheet metal or turned on a lathe since it is symmetrical. The grommet openings are readily formed and of dimensions that are not critical. The dished member forms the chamber 54 which by-passes air between inlet and outlet, and the connection of the bowl 16 to the cover member 22 likewise tightly clamps the dished member 52 in place. The extreme simplicity and economy will further be emphasized by noting that the dished member 52 has a rather sharp lip 53 that engages the gasket 32 at the same time it is engaged by flanged end 20, so that the gasket serves two functions.

Concerning the sintered bronze plug 84, for ordinary installations it was found that a porosity capable of passing particles under 28 microns produced best results, although of course variations are possible. The advantages of porous metal are that it can be made with controlled porosity, it does not become saturated with oil or deteriorated and it does not vary in characteristics over a period of time.

The interconnections of the conduits 68, 76 and the conduit from the plug 120 with the dished member 52 by way of the grommets prevents the dished member from readily separating from the cover member 22 when the device 10 is opened. This is a convenient arrangement for handling and servicing.

Variations are capable of being made without departing from the spirit and scope of the invention as defined in the appended claims.

What it is desired to secure by Letters Patent of the United States is:

1. A lubricating device adapted to be connected into an air line which comprises a bowl for holding a quantity of oil, a cover member clamped to the bowl and having an inlet and an outlet port formed therein, a dished member engaged upon the bottom of the cover member above the bowl and forming thereby an auxiliary chamber below the cover member but above the oil within the bowl, a constricted conduit between the inlet and outlet and having a dropper member opening thereto, a second conduit between the inlet and the bowl but passing through the auxiliary chamber and opening above the level of oil in the bowl whereby to pressurize the air above the oil and a third conduit from the inlet to the auxiliary chamber and there being a connection from the auxiliary chamber to the outlet, means for conducting oil from the bottom of the bowl to the dropping member and a porous metal plug immovably seated across said third conduit whereby to provide a continuous resistance to flow of air passing through the auxiliary chamber by-passing the constricted conduit which is variable directly as the variation in air pressure at said inlet.

2. A lubricating device adapted to be connected into an air line which comprises a bowl for holding a quantity of oil, a cover member clamped to the bowl and having an inlet and outlet port formed therein, a constricted passageway between inlet and outlet, an oil jet disposed in the passageway, oil feed means connected from the bottom of the bowl to the jet, an air connection between said inlet and bowl to pressurize the bowl and force the oil into said oil feed means, a by-pass passageway above the bowl and connecting the inlet and outlet having a plug of porous metal seated immovably therein blocking the same to constitute a stationary, variable flow-resistance to air entering the by-pass passageway providing even flow of oil dispensed from said device independent of variations in inlet air pressure.

3. A device as claimed in claim 2 in which the plug is of sintered bronze.

4. A device as claimed in claim 2 in which there is a manual valve in said oil feed means.

5. A device as claimed in claim 2 in which there is a visible sight glass and drip-former in said oil feed means, and a manual valve to control the rate of oil flow.

6. In a lubricating device of the character described in which there is a bowl for holding oil, a cover member with an air passage extending transversely thereof and having an inlet port, an outlet port, and a constriction between ports, an oil jet in the constriction, a pipe leading from the bottom of the bowl to a point above the air passage and connecting thence to the oil jet to introduce oil by way of the jet into the constriction, a conduit connecting the inlet to the space at the top of the bowl to pressurize same and force oil into the pipe, the invention herein, which comprises a dished member sealingly engaged to the bottom of the cover member to define an auxiliary chamber and passageways leading from inlet and outlet to said chamber so as to provide a by-pass for air around said constriction in which one of the passageways has a porous metal plug immovably seated therein variably to control the air flow through said auxiliary chamber whereby obtaining even dispensation of oil independent of variation in inlet air pressure.

7. A structure as claimed in claim 6 in which the plug is in the passageway from said inlet and the pipe also passes through the plug.

8. A lubricating device adapted to be connected into an air line which comprises a bowl for holding a quantity of oil, a cover member clamped to the bowl and having a flat bottom surface above said bowl, a transverse air passageway formed in said cover member with an inlet port, and outlet port and a constriction between ports, an oil tube in the constriction, a manually adjustable oil-dripper including a sight glass connected to said oil tube and disposed above said passageway, a conduit from the oil in the bowl to the oil-dripper and including a dip tube in the bowl, a concave member sealed to the bottom surface of the cover member and spaced above the normal level of oil in the bowl to provide an air chamber between the oil level and the bottom of the concave member and a by-pass chamber between the concave member and the bottom surface of the cover member, passageways between the by-pass chamber and each of said inlet and outlet ports, means for conveying air from said inlet to said air chamber to force oil into the bottom of said dip tube, and a porous metal plug stationarily positioned in the passageway between the inlet part and the by-pass chamber to provide a continuous, yet variable flow-resistance to air entering said by-pass chamber for various inlet air pressures, said flow-resistance ranging from a maximum value at lowest inlet air pressure to a minimum value at highest inlet air pressure thereby assuring even flow of oil dispensed from said device independent of variation in inlet air pressure.

9. A lubricating device as claimed in claim 8 in which said dip tube and air conveying means pass through said by-pass chamber and concave member.

References Cited by the Examiner
UNITED STATES PATENTS

| | | | |
|---|---|---|---|
| 1,697,814 | 1/29 | Forbes | 277—178 X |
| 2,889,009 | 6/59 | Endebak et al. | 184—55 |
| 3,023,849 | 3/62 | Tine | 184—55 |
| 3,112,013 | 11/63 | Tine | 184—55 |

LAVERNE D. GEIGER, *Primary Examiner.*

MILTON KAUFMAN, *Examiner.*